US008400412B2

United States Patent
Joo et al.

(10) Patent No.: US 8,400,412 B2
(45) Date of Patent: Mar. 19, 2013

(54) SENSITIVITY TOUCH DISPLAY PANEL AND MANUFACTURING METHOD OF THE SAME

(75) Inventors: Sun-Kyu Joo, Seoul (KR); Ju-Hyeon Baek, Cheonan-si (KR); Ji-Young Jeong, Cheonan-si (KR); Sung-Man Kim, Seoul (KR); Myung-Sub Lee, Seoul (KR)

(73) Assignee: Samsung Display Co., Ltd. (KR)

( * ) Notice: Subject to any disclaimer, the term of this patent is extended or adjusted under 35 U.S.C. 154(b) by 594 days.

(21) Appl. No.: 12/614,377

(22) Filed: Nov. 6, 2009

(65) Prior Publication Data

US 2010/0156827 A1 Jun. 24, 2010

(30) Foreign Application Priority Data

Dec. 24, 2008 (KR) .................. 10-2008-0133669

(51) Int. Cl.
*G06F 3/041* (2006.01)
(52) U.S. Cl. ....................... 345/173; 349/139
(58) Field of Classification Search .............. 345/173, 345/174; 178/18.05; 349/139
See application file for complete search history.

(56) References Cited

U.S. PATENT DOCUMENTS

| | | | |
|---|---|---|---|
| 6,501,529 B1 * | 12/2002 | Kurihara et al. | 349/160 |
| 2007/0194320 A1 | 8/2007 | Cho et al. | |
| 2007/0252614 A1 * | 11/2007 | Jeon | 324/770 |
| 2008/0151133 A1 * | 6/2008 | Kim et al. | 349/12 |
| 2008/0158199 A1 | 7/2008 | Lee et al. | |
| 2009/0268131 A1 * | 10/2009 | Tsai et al. | 349/106 |

OTHER PUBLICATIONS

URL (as of Feb. 8, 2008 using wayback machine) at http://web.archive.org/web/20080208055408/http://www.freeinfostuff.com/One-Shot/Timer.htm.*
European Search Report for corresponding EP Application No. 09 01 4581 dated Mar. 25, 2010 (4 pages).

* cited by examiner

*Primary Examiner* — Alexander S Beck
*Assistant Examiner* — Charles Zheng
(74) *Attorney, Agent, or Firm* — Innovation Counsel LLP

(57) ABSTRACT

Provided are a display panel which can detect a touch position derived from a user's touch and can prevent erroneous touch position data from being generated even when an erroneous connection to a position sensing line is present due a processing deviation or a cell gap deviation, and a manufacturing method of the same. The display panel includes a first substrate, a first sensor pad that is formed on the first substrate, a second sensor pad that is spaced apart from the first sensor pad, a second substrate that is disposed to face the first substrate, a first sensor spacer that is formed on the second substrate to overlap the first sensor pad and protrudes toward the first substrate, a second sensor spacer that is formed on the second substrate to overlap the second sensor pad and protrudes toward the first substrate, and a sensor electrode that is formed on the first sensor spacer and the second sensor spacer to overlap the first sensor pad and the second sensor pad, wherein the second sensor spacer protrudes toward the first substrate more than the first sensor spacer does.

17 Claims, 10 Drawing Sheets

SENSITIVITY TOUCH DISPLAY PANEL AND MANUFACTURING METHOD OF THE SAME

CROSS-REFERENCE TO RELATED APPLICATION

This application claims priority from Korean Patent Application No. 10-2008-0133669 filed on Dec. 24, 2008 in the Korean Intellectual Property Office, the disclosure of which is incorporated herein by reference in its entirety.

BACKGROUND OF THE INVENTION

1. Field of the Invention

The present invention relates to a display panel and a manufacturing method of the same, and more particularly, to a display panel which can detect a touch position derived from a user's touch and can prevent erroneous touch position data from being generated even when physical defects arising from a processing deviation or a cell gap deviation are present, and a manufacturing method of the display panel.

2. Description of the Related Art

A touch panel is an input means installed on an uppermost portion of a display device, such as a liquid crystal display (LCD), a field emission display (FED), a plasma display panel (PDP) or an electroluminescence display (ELD), to detect contact with a finger or a touching object, such as a stylus, so that the user may select one of a number of areas in which information is displayed on the screen of the display device.

Touch panels fall into two categories according to the operational principle used, namely, capacitive-type touch panels and resistive-type touch panels. In the capacitive-type touch panel, a transparent conductive film or a transparent conductive glass plate is repeatedly charged and discharged, as a small amount of charge accumulates between a pen-type input device, e.g., a stylus, and the transparent conductive film, and the amount of charge is detected to obtain coordinate values of the touched point. In the resistive-type touch panel, a voltage is applied between two conductive films facing each other, a user presses a screen to make the two conductive films contact each other, and a change that occurs in the voltage or current at a contacted point between the two conductive films is detected to read coordinate values of the contacted point.

Since the capacitive-type touch panel is disadvantageous in that it is necessary to supply electricity to a stylus for the capacitive-type touch panel, a resistive-type touch panel based on an analogue input method has recently been put into wide use. Here, the resistive-type touch panel may be integrated with a liquid crystal display panel, thereby preventing degradation in the luminance of the liquid crystal display panel.

The touch-panel-integrated liquid crystal display panel includes a first sensor line and a second sensor line formed on a TFT substrate in horizontal and vertical directions to detect a first coordinate for a position of an input point and a second coordinate for a position of the input point. In addition, the touch-panel-integrated liquid crystal display panel includes sensor pads formed on the TFT substrate and a sensor spacer and a sensor electrode formed on a color filter substrate to make the first sensor line come in contact with the second sensor line in response to pressure applied by a finger or stylus.

A height difference between sensor spacers formed on either the TFT substrate or on the color filter substrate may occur because of variations in dimensions arising from manufacturing processing variations. A deviation in the thickness of a cell gap, the gap between the TFT substrate and the color filter substrate of the display panel, may also occur. For these reasons, a contact between the sensor electrode and the sensor pad may undesirably occur even before a user touches the display panel, thus giving a false indication of a location of pressure application.

SUMMARY OF THE INVENTION

The present invention provides a display panel which can determine the coordinates of a touch position derived from a user's touch and can prevent false touch information from being generated even when a manufacturing processing deviation or a cell gap deviation is present in the display panel.

The present invention also provides a manufacturing method of a display panel which can determine a touch position derived from a user's touch and can prevent false touch position information from being generated even with a processing deviation or a cell gap deviation.

These and other objects of the present invention will be described in or be apparent from the following description of the preferred embodiments.

According to an aspect of the present invention, there is provided a display panel including a first substrate, a first sensor pad that is formed on the first substrate, a second sensor pad that is spaced apart from the first sensor pad, a second substrate that is disposed to face the first substrate, a first sensor spacer that is formed on the second substrate to overlap the first sensor pad and protrudes toward the first substrate, a second sensor spacer that is formed on the second substrate to overlap the second sensor pad and protrudes toward the first substrate, and a sensor electrode that is formed on the first sensor spacer and the second sensor spacer to overlap the first sensor pad and the second sensor pad, wherein the second sensor spacer protrudes toward the first substrate farther than the first sensor spacer.

According to another aspect of the present invention, there is provided a display panel including a first substrate, a second substrate that is disposed to face the first substrate, a common electrode that is formed on the second substrate, a first sensor spacer that is formed on the first substrate and protrudes toward the second substrate, a second sensor spacer that is formed on the first substrate and protrudes toward the second substrate, a first sensor pad that is formed on the first sensor spacer, a second sensor pad that is formed on the second sensor spacer and is spaced apart from the first sensor pad, and a sensor electrode that is formed on the second substrate to overlap the first sensor pad and the second sensor pad, wherein the second sensor spacer protrudes toward the second substrate farther than the first sensor spacer.

According to still another aspect of the present invention, there is provided a manufacturing method of a display panel, the method including forming a first sensor pad and a second sensor pad that are spaced apart from each other on a first substrate, forming a first sensor spacer and a second sensor spacer on a second substrate to overlap the first sensor pad and the second sensor pad, respectively, and to protrude toward the first substrate, the second sensor spacer protruding toward the first substrate farther than the first sensor spacer, forming a sensor electrode on the first sensor spacer and the second sensor spacer to overlap the first sensor pad and the second sensor pad, and disposing the second substrate to face the first substrate.

BRIEF DESCRIPTION OF THE DRAWINGS

The above and other features and advantages of the present invention will become more apparent in view of the following detailed description of preferred embodiments thereof, taken with reference to the attached drawings in which.

DETAILED DESCRIPTION OF THE INVENTION

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Accordingly, in some specific embodiments, well known processing steps, devices or methods will not be described in detail in order to avoid obscuring the invention. Like numbers refer to like elements throughout.

Spatially relative terms, such as "below", "beneath", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
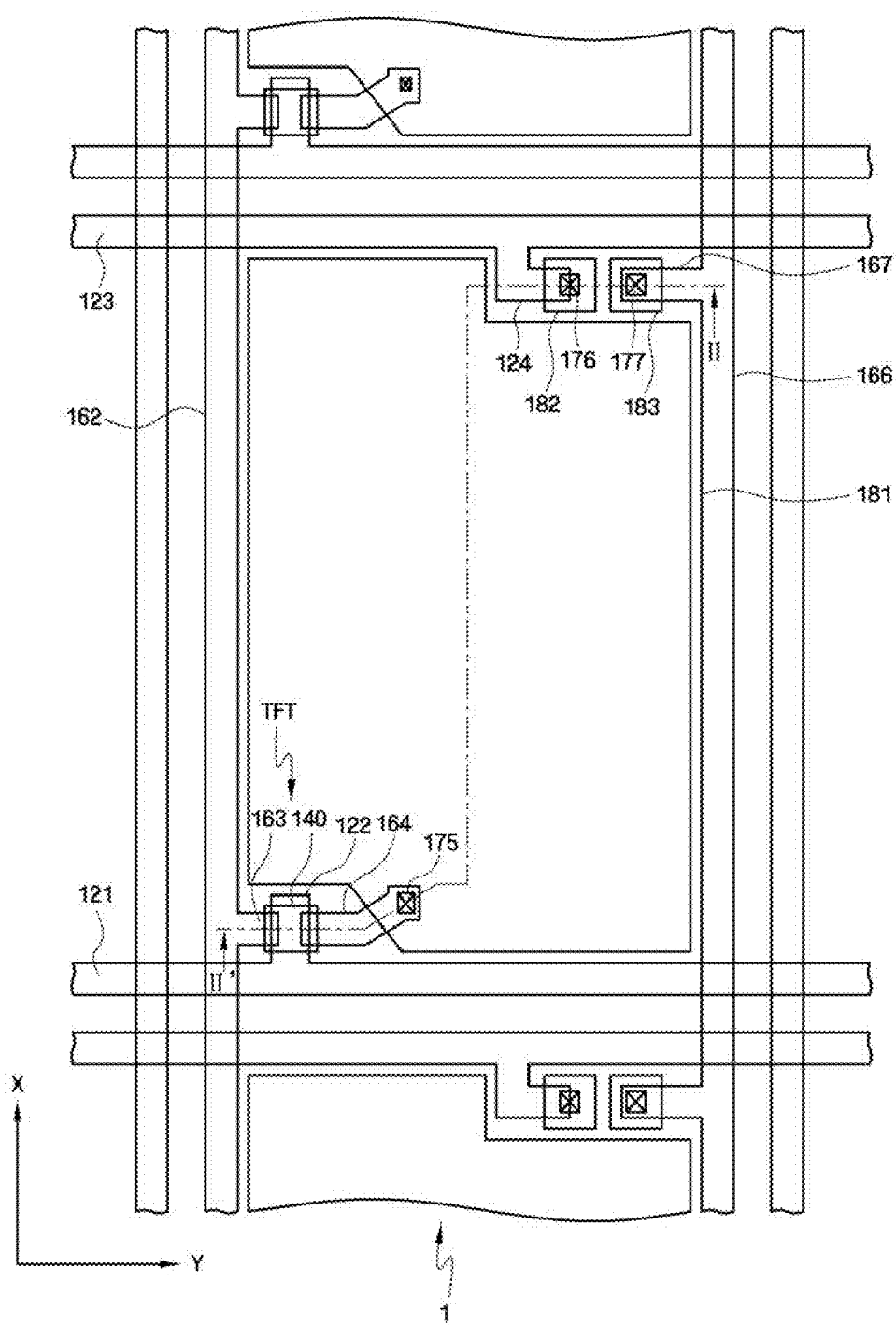
FIG. 1 is a layout view of a representative portion of a lower panel of a display panel according to a first embodiment of the present invention.
Figure 2:
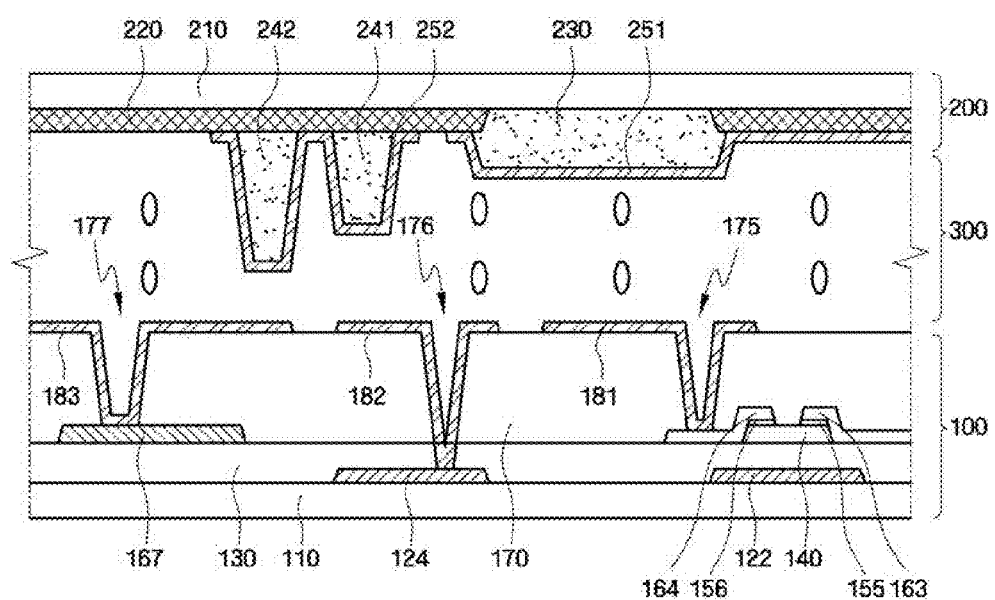
FIG. 2 is a cross-sectional view of the representative portion of the display panel taken along the line II-IP of FIG. 1 and including an upper panel in addition to the lower panel of FIG. 1.

Hereinafter, a display panel according to a first exemplary embodiment of the present invention will be described in detail with reference to FIGS. 1 through 3.

A display panel according to a first embodiment of the present invention will first be described with reference to FIGS. 1 and 2. FIG. 1 is a layout view of one pixel of a display panel according to a first embodiment of the present invention and FIG. 2 is a cross-sectional view of the display panel taken along the line II-II' of FIG. 1. FIG. 1 includes a lower panel only whereas FIG. 2 includes the lower panel and an upper panel. The pixel shown in FIG. 1 is one of an array of pixels arranged in rows and columns. The coordinates of a pixel are X and Y, where X is the number of the row and Y is the number of the column in which the pixel is located.

The display panel according to the first embodiment of the present embodiment includes a lower panel 100 and an upper panel 200, facing each other, and a liquid crystal layer 300 interposed between the lower and upper panels 100 and 200.

The lower panel 100 includes a first substrate 110 upon which are disposed a gate line 121, a first sensor line 123, a data line 162, a second sensor line 166, a thin film transistor ("TFT"), a pixel electrode 181, a first sensor pad 182, and a second sensor pad 183.

The gate line 121 extends in a first direction to transmit a gate signal to the TFT. In an exemplary embodiment, the first direction may be a transverse direction, that is to say the Y direction as shown in FIG. 1. The gate line 121 may be formed as a single layer or multiple layers made of molybdenum (Mo), niobium (Nb), copper (Cu), aluminum (Al), chromium (Cr), silver (Ag), tungsten (W), titanium (Ti), or alloys thereof. The TFT includes a gate electrode 122 that is formed such that the gate electrode 122 is a branch extended from the gate line 121.

The first sensor line 123 extends in the first direction and is parallel with the gate line 121. The first sensor line 123 is formed in the same layer using the same material as that used for the gate line 121. A gate insulating film 130 is coated on the gate line 121 and the first sensor line 123.

A semiconductor layer 140 is formed of hydrogenated amorphous silicon or polycrystalline silicon on the gate insulating film 130. Ohmic contact layers 155 and 156 are formed of a silicide or of a material heavily doped with n-type impurities, such as n+hydrogenated amorphous silicon. The ohmic contact layers 155 and 156 are disposed as a pair on the semiconductor layer 140, with a gap separating the ohmic contact layer 155 from the ohmic contact layer 156.

A source electrode 163 extending from the data line 162, and a drain electrode 164 corresponding to the source electrode are formed on the ohmic contact layers 155 and 156, respectively, and on the gate insulating film 130.

The data line 162 is formed on the first substrate 110 and extends in a second direction to transmit a data signal to each pixel. In an exemplary embodiment, the second direction may be a longitudinal direction, that is to say the X direction as shown in FIG. 1. That is to say, the data line 162 and the gate line 121 may be formed to cross each other. The data line 162 may be formed as a single layer or multiple layers made of molybdenum (Mo), niobium (Nb), copper (Cu), aluminum (Al), chromium (Cr), silver (Ag), tungsten (W), titanium (Ti), or alloys thereof.

The second sensor line 166 is formed parallel with the data line 162. The second sensor line 166 is formed in the same layer using the same material as that used for the data line 162. The source electrode 163, as stated above, is an extension of the data line 162 extending toward the drain electrode 164. The drain electrode 164 transmits a data signal to a pixel electrode 181.

The gate electrode 122, the source electrode 163 and the drain electrode 164 constitute three terminals of a thin film transistor (TFT). The TFT transmits the data signal input to the source electrode 163 to the pixel electrode 181 via the drain electrode 164 in response to a gate signal.

The TFT includes the semiconductor layer 140 overlapping the gate electrode 122 with the gate insulating film 130 disposed therebetween to enable the formation of a channel in the semiconductor layer 140 between the source electrode 163 and the drain electrode 164.

A passivation layer 170 may include, for example, an inorganic insulating material such as silicon nitride ($SiN_x$) or silicon oxide ($SiO_x$), or an organic insulating material such as acrylic or polyimide benzoclylobutene (BCB). Here, the passivation layer 170 may be formed as a single layer or multiple layers made of an inorganic material or an organic material. The passivation layer 170 is formed to cover the TFT and the gate insulating film 130, thereby insulating the TFT from the pixel electrode 181.

The passivation layer 170 includes first through third contact holes 175, 176 and 177 exposing the drain electrode 164, a first sensor wiring extension 124 of the first sensor line 123 and a second sensor wiring extension 167 of the second sensor line 166, respectively. Here, the first through third contact holes 175, 176 and 177 are formed by etching portions of the passivation layer 170 exposed by a mask.

The pixel electrode 181 is formed on the passivation layer 170. The pixel electrode 181 is connected to the drain electrode 164 of the TFT through the first contact hole 175. The pixel electrode 181 is formed of a transparent conductor material such as indium tin oxide (ITO) or indium zinc oxide (IZO), or a reflective conductor material such as aluminum.

The first sensor pad 182 is separated by a gap from a sensor electrode 252 (to be described later) and, in response to a pressure applied to the display panel by a finger or stylus comes into contact with the sensor electrode 252 and transmits a signal for recognizing an X-axis coordinate value to or from the first sensor wiring 123. The first sensor pad 182 is connected through the second contact hole 176 to a first sensor wiring extension 124 that extends from the first sensor line 123.

The second sensor pad 183 is separated by a gap from the sensor electrode 252 and, in response to a pressure applied to the display panel by a finger or stylus, transmits a signal for recognizing a Y-axis coordinate value to or from the second sensor line 166. The second sensor pad 183 is connected, through the third contact hole 177, to a second sensor wiring extension 167 that extends from the second sensor line 166.

The first sensor pad 182 and the second sensor pad 183 are formed to overlap sensor spacers 241 and 242 (to be described later) and the sensor electrode 252. The first sensor pad 182 and the second sensor pad 183 may be formed by using the same material as that used for the pixel electrode 181 and by using the same process as that used for the pixel electrode 181.

The upper panel 200 includes a second substrate 210, upon which are disposed a black matrix 220 for blocking light leakage, a color filter 230 for displaying colors, and a common electrode 251 for applying a common voltage to the liquid crystal layer 300.

The second substrate 210 may be formed of a transparent insulating material, for example plastic or glass, through which light can pass and which is capable of forming a smoothly curved surface in response to pressure applied to the top surface of the second substrate 210.

The black matrix 220 prevents light from being emitted through a region where liquid crystal is not controllable. It is formed to overlap the TFT, the gate line 121, the data line 162, the first sensor line 123 and the second sensor line 166, which are provided in the lower panel 100. The black matrix 220 may be formed of an opaque organic material or an opaque metal.

The color filter 230 transmits one of the primary colors red, green, and blue. The color filter 230 absorbs or transmits light of a specific wavelength, for example, through red, green, and blue pigments, thereby displaying red, green, and blue colors. Various colors are displayed by additive mixture of the transmitted red, green, and blue colors.

The common electrode 251 is formed over the color filter 230 and the black matrix 220. An overcoat layer (not shown) may be formed over the color filter 230 and the black matrix 220 to achieve good step coverage. The common electrode 251 may be formed on the overcoat layer. Here, the common electrode 251 may be a layer of a transparent conductive material such as indium tin oxide (ITO) or indium zinc oxide (IZO). An electric field is applied through the liquid crystal layer 300 by the application of a voltage that is the difference between the common voltage supplied from a common voltage generator to the common electrode 251 and a data voltage applied to the pixel electrode 181.

The first sensor spacer 241 and the second sensor spacer 242 may be formed on the black matrix 220. In other words, the first sensor spacer 241 and the second sensor spacer 242 may be formed to overlap the black matrix 220 through which light is not transmitted. The sensor electrode 252 is formed on the first sensor spacer 241 and the second sensor spacer 242. The first sensor spacer 241 and the second sensor spacer 242 may be formed of an organic material. The first sensor spacer 241 and the second sensor spacer 242 may also be formed by a process that is used simultaneously for both. In the exemplary embodiment illustrated in FIG. 2, the first sensor spacer 241 and the second sensor spacer 242 are formed by using the same material as that used for the color filter 230, which is, however, provided for illustration only. However, in alternative embodiments, the first sensor spacer 241 and the second sensor spacer 242 may be formed together with or separately from the overcoat layer (not shown) on the black matrix 220.

The first sensor spacer 241 and the second sensor spacer 242 protrude toward the first substrate 110. The second sensor spacer 242 protrudes toward the first substrate 110 farther than the first sensor spacer 241 does. The first sensor spacer 241 and the second sensor spacer 242 may be formed adjacent to each other and spaced apart from each other by a predetermined distance.

As described above, the sensor electrode 252 is formed on the first sensor spacer 241 and the second sensor spacer 242. When a pressure is applied to a location on the upper panel 200 according to a user's contact, for example by the application of a finger or a stylus, the second substrate 210 becomes curved downward and the first sensor spacer 241 and the second sensor spacer 242 are brought into contact with the first sensor pad 182 and the second sensor pad 183, respectively, the location on the upper panel 200 to which the pressure is applied can be determined.

Before an external force is applied to the upper panel 200, the first sensor pad 182 and the first sensor spacer 241 are spaced apart from each other by a predetermined distance. The second sensor pad 183 and the second sensor spacer 242 are also spaced apart from each other by a predetermined distance. Here, the predetermined distance between the second sensor pad 183 and the second sensor spacer 242 may be smaller than the predetermined distance between the first sensor pad 182 and the first sensor spacer 241. Accordingly, when an external pressure is applied to the upper panel 200, the second sensor spacer 242 is first brought into contact with the second sensor pad 183. Then, if the pressure exceeds a force supported by the second sensor spacer 242 is applied to the upper panel 200, the second sensor spacer 242 may be compressed and the first sensor spacer 241 contacts the first sensor pad 182. If a pressure, e.g., a force of 80 gf(gram*force) or greater, is additionally applied in a state in which the second sensor spacer 242 contacts the second sensor pad 183, then the first sensor spacer 241 contacts the first sensor pad 182.

A height difference between the second sensor spacer 242 and the first sensor spacer 241 may be 0.1 μm or greater. If the height difference between the second sensor spacer 242 and the first sensor spacer 241 is maintained to be 0.1 μm or greater, a difference between the distance between the first sensor pad 182 and the first sensor spacer 241 and the distance between the second sensor pad 183 and the second sensor spacer 242 can be made to be 0.1 μm or greater.

Also, the sensor electrode 252, formed on the first sensor spacer 241 and the second sensor spacer 242, may be formed of the same material as that used for the common electrode 251 and may be formed by the same process. Further, the sensor electrode 252 may be insulated from the common electrode 251 and allowed to float at a floating potential. Alternatively, the sensor electrode 252 may be in electrical contact with the common electrode 251 or may be an integral part of the common electrode 251. The sensor electrode 252 may be formed on the first sensor spacer 241 and the second sensor spacer 242 in a single island shape.

In the display panel according to the first embodiment of the present invention, when an external pressure is applied to a location on the upper panel 200 according to a user's contact, the first sensor spacer 241 and the second sensor spacer 242 contact the first sensor pad 182 and the second sensor pad 183, respectively. The sensor electrode 252, which, as stated, is disposed on the first sensor spacer 241 and the second sensor spacer 242, connects the first sensor pad 182 to the second sensor pad 183. Here, an X-coordinate is obtained when a current or a voltage is applied through the first sensor line 123 and a Y-coordinate is obtained when the applied current or voltage passes through the sensor electrode 252 to the second sensor line 166. Alternatively, the current or voltage may be applied to the second sensor line 166 and detected on the first sensor line 123. The first sensor spacer 241 and the second sensor spacer 242 are formed to have a height difference relative to each other. That is to say, one of the first sensor spacer 241 and the second sensor spacer 242 is formed to be higher than the other.

Figure 3A:
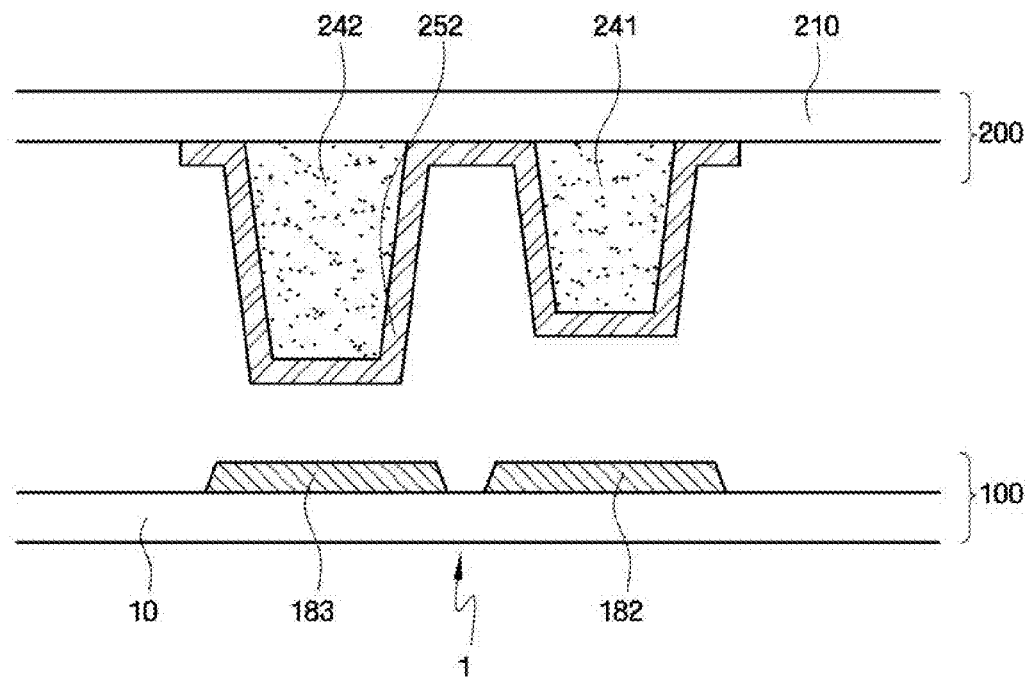
FIGS. 3A through 3C are cross-sectional views schematically showing the operating process of the display panel shown in FIG. 1.
Figure 3B:
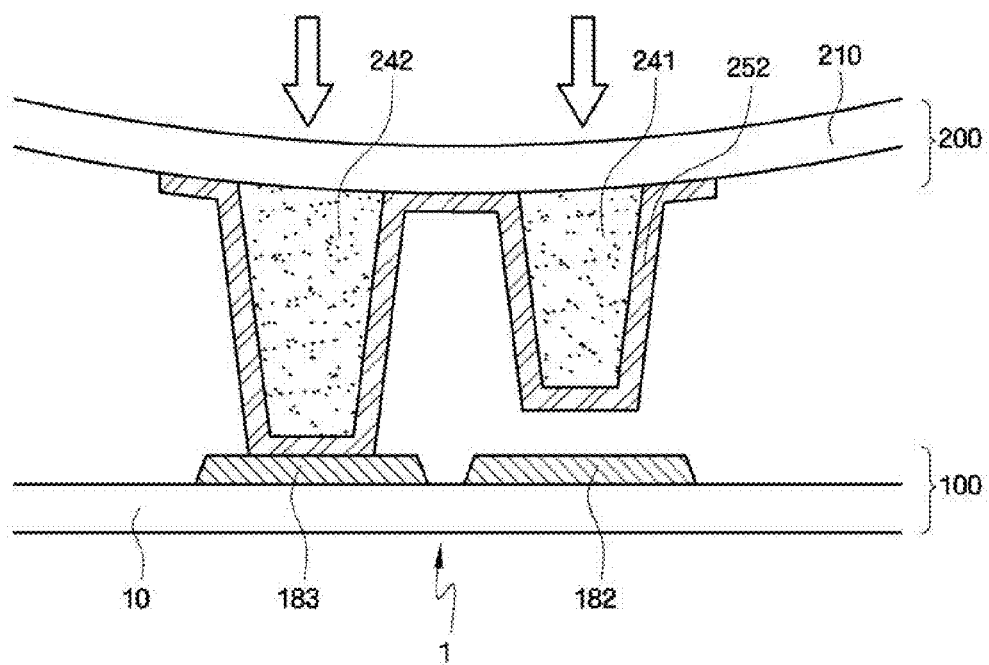
Figure 3C:
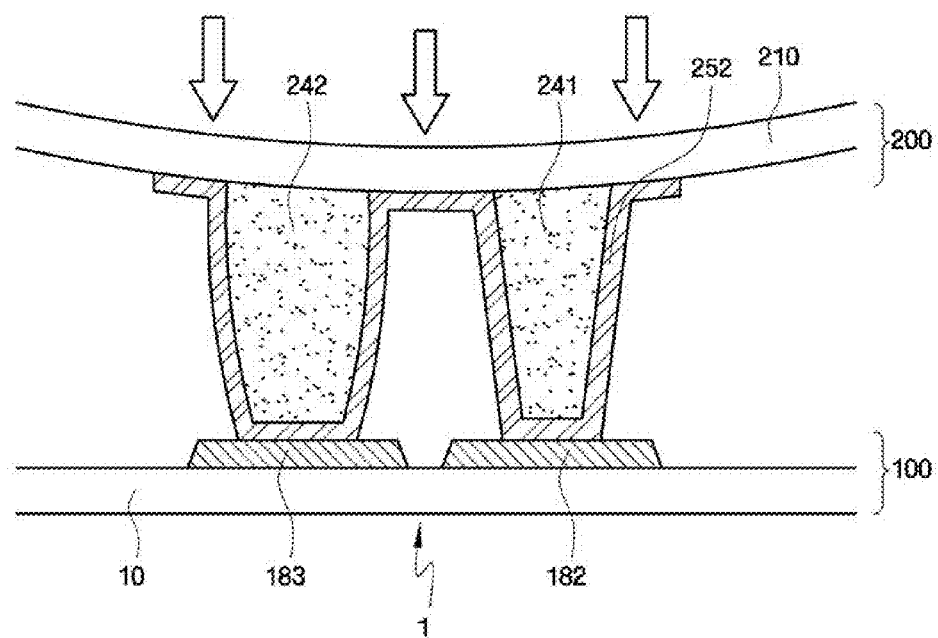

Hereinafter, the operating process of the display panel 1 according to the first embodiment of the present invention will be described with reference to FIGS. 3A through 3C. FIGS. 3A through 3C are cross-sectional views schematically showing the operating process of the display panel shown in FIG. 1.

Referring to FIG. 3A, FIG. 3A illustrates an initial state of the display panel 1, where there is no external pressure applied. In the initial state of the display panel 1, the lower panel 100 and the upper panel 200 are parallel with each other. Here, the first sensor spacer 241 is separated from the first sensor pad 182 by a predetermined distance, and the second sensor spacer 242 is separated from the second sensor pad 183 by a predetermined distance, respectively. The first sensor pad 182 and the second sensor pad 183 are insulated from each other.

In the initial state, the distance between the second sensor spacer 242 and the second sensor pad 183 is smaller than the distance between the first sensor spacer 241 and the first sensor pad 182.

Referring to FIG. 3B, FIG. 3B illustrates a state in which pressure is applied to the display panel 1, specifically to a top surface of the upper panel 200. The pressure applied to the upper panel 200 makes a portion of the upper panel 200 move toward the lower panel 100, and the portion of the sensor electrode 252 on the second sensor spacer 242 comes in contact with the second sensor pad 183. The pressure is, however, not sufficient to bring the portion of the sensor electrode 252 on the first spacer 241 into contact with the first sensor pad 182 and the first sensor pad 182 is not connected to the second sensor pad 183 by the sensor electrode 252. Here, since the sensor electrode 252 is a floating electrode and since the first sensor spacer 241 and the first sensor pad 182 are separated from each other, a connection between a first sensor line 123 and a second sensor line 166 is not made and the coordinates of the pixel are not read.

FIG. 3C illustrates a state in which a force exceeding a reference pressure is applied to the display panel 1 when the second sensor spacer 242 is in contact with the second sensor pad 183. If a force of, for example, 80 gf or greater, is applied to the display panel 1, the first sensor spacer 241 and the first sensor pad 182 contact each other. Accordingly, the sensor electrode 252 electrically connects the first sensor pad 182 to the second sensor pad 183.

Since the sensor electrode 252 allows the first sensor pad 182 and the second sensor pad 183 to be electrically connected to each other, a reference voltage applied to the first sensor pad 182 via the first sensor line 123 is transmitted through the second sensor pad 183 and is detectable on the second sensor line 166. Thus the X-coordinate value corresponding to a location to which the pressure is applied is recognized, and the Y-coordinate value corresponding to the location to which the pressure is applied is read.

In the alternative case, in which the sensor electrode is not a floating electrode, but is an integral part of the common electrode or is electrically connected to the common electrode, the operation of reading the coordinates of a pixel in an area where pressure is applied is different from the floating sensor electrode case. When a common voltage is present on the common electrode 251 and on the sensor electrode 252, and when the second sensor pad 183 comes in contact with the sensor electrode 252 the common voltage appears on the second sensor line 166, thus providing the Y coordinate, regardless of the condition of the first sensor pad 182. When the pressure is sufficient to bring the second sensor pad 183 and the first sensor pad 182 into contact with the sensor electrode 252, the common voltage appears on both the second sensor line 166 and the first sensor line 123, thus providing the X and Y coordinates of the pixel.

Figure 4A:
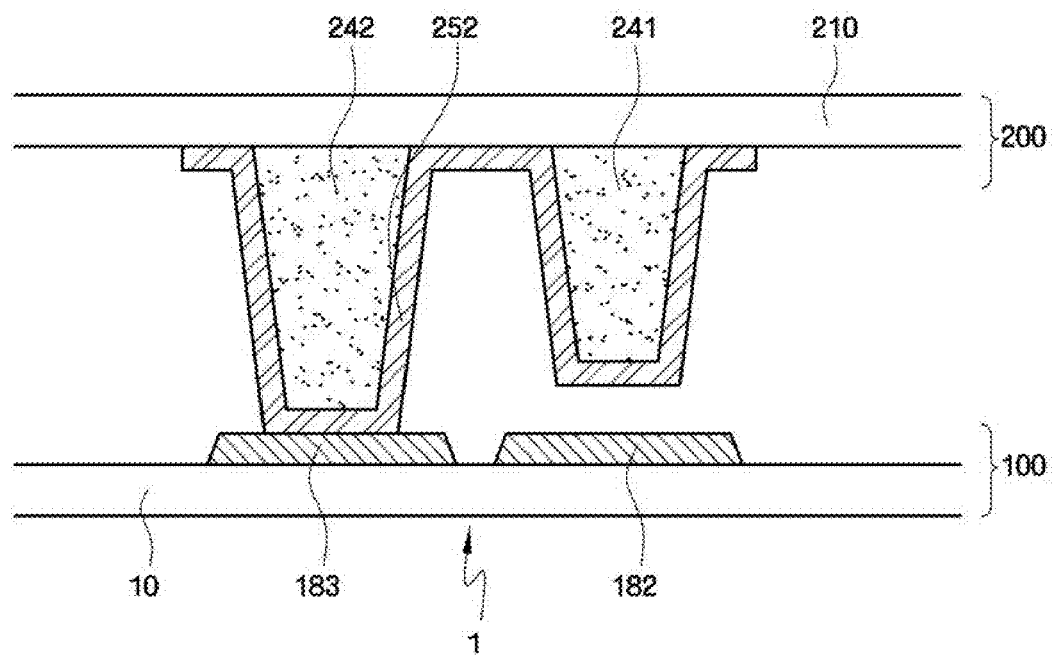
FIGS. 4A and 4B are cross-sectional views schematically showing the operating process of a display panel having one of two sensor pads contacting a sensor electrode.
Figure 4B:
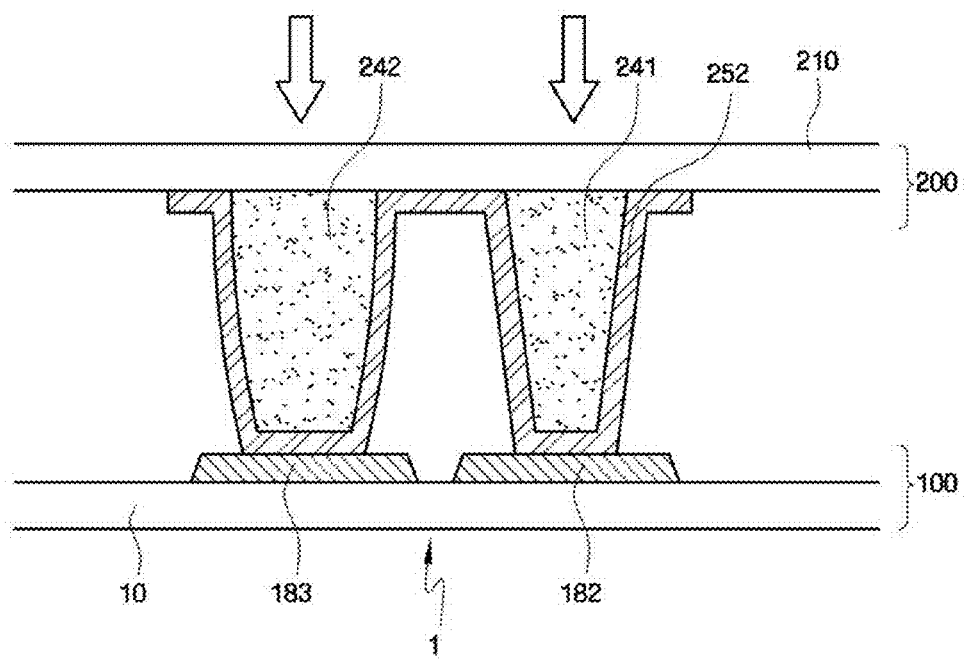

Hereinafter, the operating process of the display panel 1, in which a defect is present which causes one of the first sensor pad 182 and the second sensor pad 183 to be in contact with the sensor electrode 252 due to a processing deviation, will be described with reference to FIGS. 4A and 4B. FIGS. 4A and 4B are cross-sectional views schematically showing the operating process of a display panel in which despite the absence of any pressure applied by touch, one of the two sensor pads is in contact with the sensor electrode.

Referring to FIG. 4A illustrating an initial state in which the display panel 1 in which a manufacturing defect is present in that the second sensor spacer 242 is in contact the second sensor pad 183, where no external pressure is applied, and the lower panel 100 and the upper panel 200 of the display panel 1 are parallel with each other. One or more or even all of the pixels on the display panel may contain such a pressure sensor defect. A height difference between the first sensor spacer 241 and the second sensor spacer 242 may be generated due to a processing deviation. However, since the first sensor spacer 241 and the second sensor spacer 242 are formed by the same process, the height difference between the first sensor spacer 241 and the second sensor spacer 242 can be maintained to be constant. Therefore, if heights of the first sensor spacer 241 and the second sensor spacer 242 are greater than reference height levels or a cell gap between the upper panel 200 and a lower panel 100 is smaller than a reference cell gap, the second sensor spacer 242 and the second sensor pad 183 contact each other as shown in FIG. 4A, so that the sensor electrode 252 and the second sensor pad 183 are electrically connected to each other.

As described above, if the sensor electrode 252 and the second sensor pad 183 are electrically connected to each other in the initial state where there is no external pressure applied, the first sensor pad 182 and the sensor electrode 252 are not electrically connected to each other, the X,Y coordinates of the defective pixel are not read. Thus, it is properly determined that no pressure is applied to the pixel in which the defective pressure sensor is present.

Referring to FIG. 4B illustrating a state in which an external force exceeding a reference pressure is applied to the display panel 1, if a pressure, e.g., a force of 80 gf or greater, is additionally applied in a state in which the second sensor spacer 242 is in a contact with the second sensor pad 183, the first sensor spacer 241 and the first sensor pad 182 contact each other, so that the sensor electrode 252 allows the first sensor pad 182 and the second sensor pad 183 to be electrically connected to each other.

As the sensor electrode 252 allows the first sensor pad 182 and the second sensor pad 183 to be electrically connected to each other, the reference voltage applied to either the first sensor pad 182 via the first sensor line 123 or the second sensor pad 183 via the second sensor line 166 is detectable either at the second sensor line 166 or the first sensor line, respectively, so that an X-coordinate value indicating the contacted position when the pressure is applied can be read, and a Y-coordinate value indicating the contacted position when the pressure is applied can be read.

In the present invention, a height difference that is intentionally created between the first sensor spacer 241 and the second sensor spacer 242 in the above-described manner, provides a display panel 1 having increased reliability in determining touch location despite the presence of defects in which either the first sensor spacer 241 or the second sensor spacer 242 contacts the first or second sensor pad 182 or 183, respectively, due to a processing deviation.

Hereinafter, the manufacturing process of an upper panel of the display panel according to the first embodiment of the present invention will be described with reference to FIGS. 5A through 5D. FIGS. 5A through 5D are cross-sectional views showing the manufacturing process of an upper panel of the display panel shown in FIG. 1.

Figure 5A:
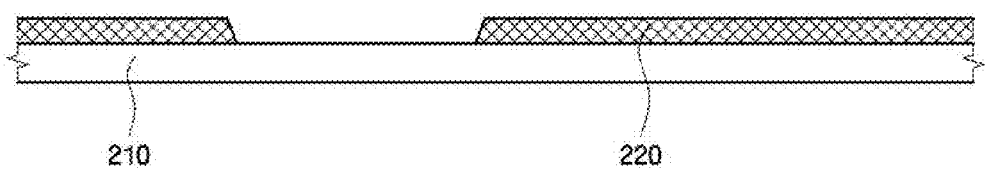
FIGS. 5A through 5D are cross-sectional views showing the manufacturing process of an upper panel of the display panel shown in FIG. 1.

Referring first to FIG. 5A, the black matrix 220 is formed on the second substrate 210. The black matrix 220 is formed by coating an opaque organic material or an opaque metal on the second substrate 210 and patterning the same by photolithography in which unwanted material is removed by etching. The black matrix 220 is formed to have a predetermined width to prevent opaque metal patterns from being viewed from the lower panel 100. Here, the second substrate 210 may be formed of a transparent insulating material, such as plastic or glass, capable of forming a smoothly curved surface even when a pressure, applied by for example a finger or a stylus, is applied to the surface of the second substrate 210.

Figure 5B:
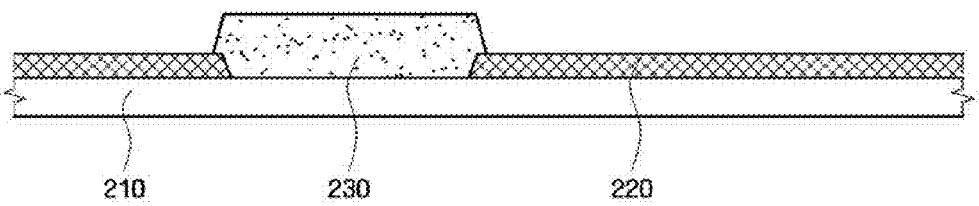

Referring to FIG. 5B, the color filter 230 is formed on the second substrate 210 having the black matrix 220. The color filter 230 may be formed by photolithography. The color filter 230 filters white light to provide one of three primary colors, for example, red, blue and green. The pixels may be arranged in groups of three, wherein the color filters are arranged in an order of red, green, and blue colors, the order being repeated thought the display panel.

Figure 5C:
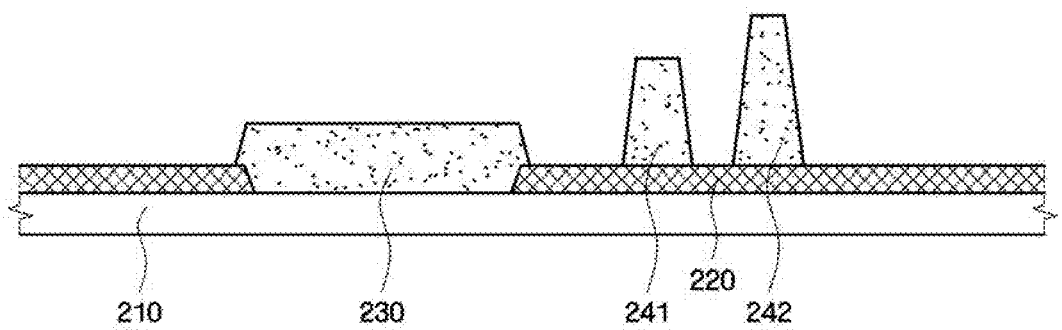

Referring to FIG. 5C, the first sensor spacer 241 and the second sensor spacer 242 are formed on the black matrix 220. The first sensor spacer 241 and the second sensor spacer 242 may be formed of an organic material or conductive polymer.

The first sensor spacer 241 and the second sensor spacer 242 may be formed by coating a photosensitive organic material on the entire surface of the second substrate 210 and partially etching the resultant structure using a slit mask or a halftone mask. That is to say, the first sensor spacer 241 and the second sensor spacer 242 may be partially exposed to generate a height difference therebetween. Using the photosensitive organic material as described in the present embodiment illustrated in FIG. 5C is provided for illustration only. However, in alternative embodiments, inkjet printing may be employed, or a photoresist may be coated on an organic material coating to then be patterned.

Figure 5D:
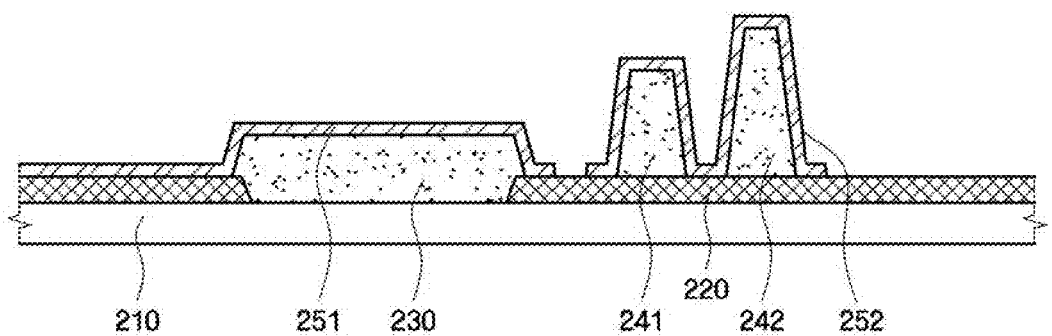

Referring to FIG. 5D, the common electrode 251 is formed on the black matrix 220 and the color filter 230, and the sensor electrode 252 is formed on the first sensor spacer 241 and the second sensor spacer 242.

First, a transparent conductive material is applied to the surface of the black matrix 220, the color filter 230, the first sensor spacer 241 and the second sensor spacer 242 by sputtering or the like. To this end, ITO or IZO is sued as the transparent conductive material. The transparent conductive material layer is patterned by photolithography in which a step of etching using a mask is used to form the common electrode 251 and the sensor electrode 252.

Figure 6:
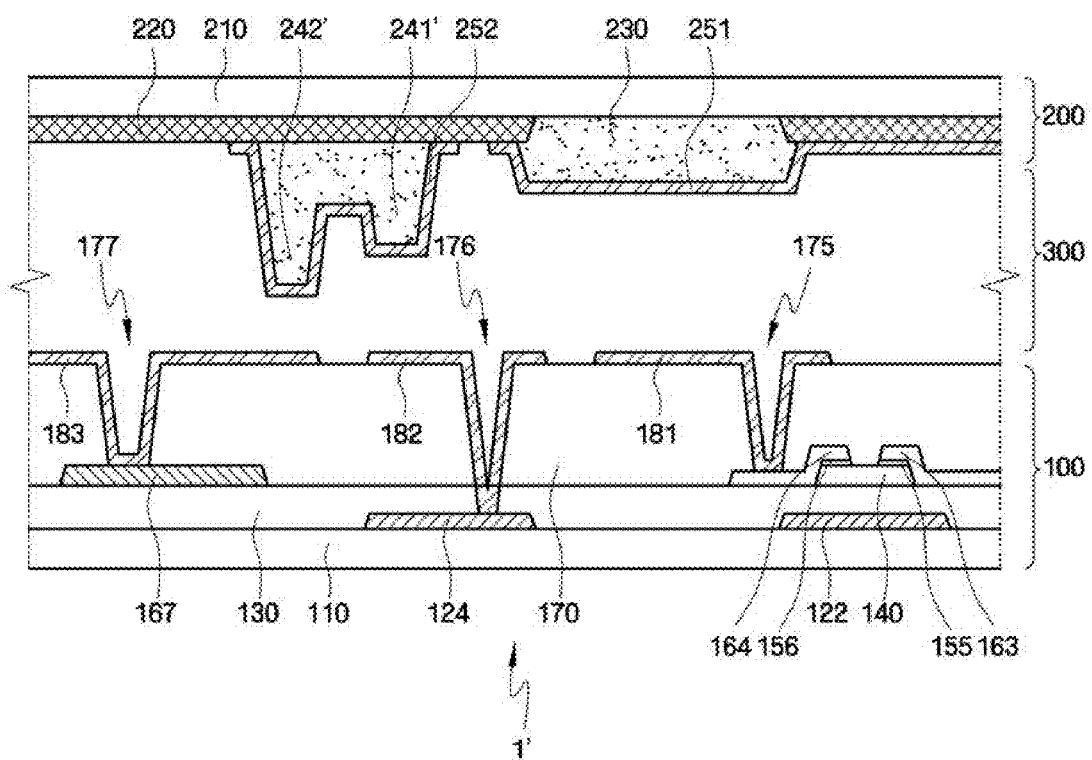
FIG. 6 is a cross-sectional view of a display panel according to a second embodiment of the present invention.

Hereinafter, a display panel according to a second embodiment of the present invention will be described with reference to FIG. 6. FIG. 6 is a cross-sectional view of a display panel according to a second embodiment of the present invention. For descriptive convenience, components having the same function as described with reference to the first embodiment are respectively identified by the same reference numerals, and their repetitive description will be omitted.

In the display panel 1' according to the second embodiment of the present invention, lateral sides of a first sensor spacer 241' and a second sensor spacer 242' are connected to each other. In detail, an upper panel 200 includes a second substrate 210 upon which are disposed a black matrix 220 for blocking light leakage, a color filter 230 for displaying colors, and a common electrode 251 for applying a common voltage to the liquid crystal layer 300.

The black matrix 220 is formed on the second substrate 210. The black matrix 220 is formed to overlap the TFT of a lower panel 100, and other parts of the lower panel including, a gate line 121, a data line 162, a first sensor wiring 123 and a second sensor wiring 166. A color filter 230 is formed on the second substrate in an opening in the black matrix 220 corresponding to a pixel area.

The common electrode 251 is formed on the color filter 230 and the black matrix 220.

The first sensor spacer 241' and the second sensor spacer 242' may be formed on the black matrix 220. That is to say, the first sensor spacer 241' and the second sensor spacer 242' are formed to overlap the black matrix 220 by which light is blocked. A sensor electrode 252 is formed on the first sensor spacer 241' and the second sensor spacer 242'. The first sensor spacer 241' and the second sensor spacer 242' have the respective lateral sides connected to each other by a portion of the material of the sensor spacers which remains on the black matrix between the first sensor spacer and the second sensor spacer. In other words, two peaks may be formed on a single island thus providing the first sensor spacer 241' and the second sensor spacer 242'. Here, the first sensor spacer 241' and the second sensor spacer 242' may be shaped in the form of a peak.

The first sensor spacer 241' and the second sensor spacer 242' protrude toward the first substrate 110. The second sensor spacer 242' protrudes toward the first substrate 110 farther than the first sensor spacer 241' does.

A height difference between the first sensor spacer 241' and the second sensor spacer 242' may be 0.1 μm or greater. If the height difference between the first sensor spacer 241' and the second sensor spacer 242' is maintained to be 0.1 μm or greater, a difference between the distance between the first sensor pad 182 and the first sensor spacer 241' and the distance between the second sensor pad 183 and the second sensor spacer 242' can be made to be 0.1 μm or greater.

Also, the sensor electrode 252 formed on the first sensor spacer 241' and the second sensor spacer 242' may be formed of the same material that is used in forming the common electrode 251 by the same process. Further, the sensor electrode 252 may be insulated from the common electrode 251 so as to be at a floating potential. The sensor electrode 252 may be formed on the first sensor spacer 241' and the second sensor spacer 242' in the shape of an island.

Figure 7:
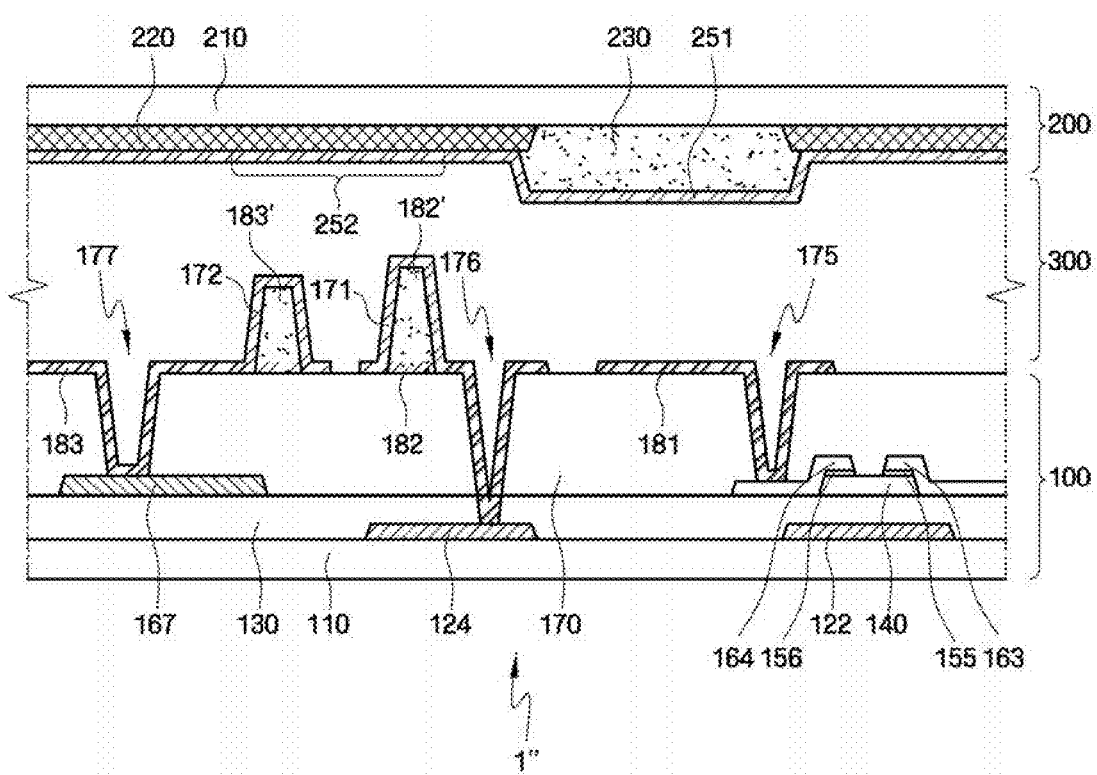
FIG. 7 is a cross-sectional view of a display panel according to a third embodiment of the present invention.

Hereinafter, a display panel according to a third embodiment of the present invention will be described with reference to FIG. 7. FIG. 7 is a cross-sectional view of a display panel according to a third embodiment of the present invention. For descriptive convenience, components having the same function as described with reference to the first embodiment are respectively identified by the same reference numerals, and their repetitive description will be omitted.

The display panel 1" according to the third embodiment of the present invention includes a first sensor spacer 171 and a second sensor spacer 172, both formed on a lower panel 100.

The first sensor spacer 171 and second sensor spacer 172 are formed on a first substrate 110. The first sensor spacer 171 and the second sensor spacer 172 are formed to overlap a black matrix 220 by which light is blocked, and a first sensor pad 182' and a second sensor pad 183' are formed on the first sensor spacer 171 and the second sensor spacer 172, respectively. The first sensor spacer 171 and the second sensor spacer 172 may be formed of an organic material.

The first sensor spacer 171 and the second sensor spacer 172 protrude toward a second substrate 210. The first sensor spacer 171 protrudes toward the second substrate 210 farther than the second sensor spacer 172 does. The first sensor spacer 171 and the second sensor spacer 172 may be formed to be adjacent to each other or to be spaced apart from each other.

A common electrode 251 overlapping the first sensor spacer 171 and the second sensor spacer 172 may be formed on a second substrate 210. In this embodiment, a portion of the common electrode 251 overlapping the first sensor spacer 171 and the second sensor spacer 172 becomes a sensor electrode.

When a pressure is applied to a location on an upper panel 200 according to a user's contact, the common electrode 251 as well as the second substrate 210 become curved downward, and the common electrode 251 comes into contact with the first sensor pad 182' and the second sensor pad 183' formed on the first sensor spacer 171 and the second sensor spacer 172, so that the location on the upper panel 200 to which the pressure is applied can be ascertained.

Before an external force is applied to the upper panel 200, the first sensor spacer 171 and the second sensor spacer 172 are spaced apart from the common electrode 251 by predetermined distances. Here, the distance between the common electrode 251 and the first sensor spacer 171 may be smaller than the distance between the common electrode 251 and the second sensor spacer 172. Thus, if the external force is applied to the upper panel 200, the first sensor spacer 171 comes into contact with the common electrode 251. Then, if the external force exceeds a reference pressure supported by the first sensor spacer 171 is applied to the upper panel 200, the first sensor spacer 171 may be compressed and the second sensor spacer 172 comes into contact with the common electrode 251. As described above, when the first sensor pad 182' and the second sensor pad 183' come into contact with the common electrode 251, a common voltage applied to the common electrode 251 is transmitted to the first sensor pad 182' and from there to the first sensor line 123, and to the second sensor pad 183' and from there to the second sensor line 166, so that the contacted positions to which the pressure is applied can be recognized.

However, the sensor electrode 252 is not necessarily a part of the common electrode 251. That is to say, the sensor electrode 252 may be a floating electrode that is separated from the common electrode 251. For example, the sensor electrode may be formed by patterning a part of the common electrode 251. Here, the sensor electrode may be formed such that it overlaps both the first sensor spacer 171 and the second sensor spacer 172.

A height difference between the first sensor spacer 171 and the second sensor spacer 172 may be 0.1 μm or greater. If the height difference between the first sensor spacer 171 and the second sensor spacer 172 is maintained to be 0.1 μm or greater, a difference between a distance between the common electrode 251 and the first sensor spacer 171, and a distance between the common electrode 251 and the second sensor spacer 172, can be made to be 0.1 μm or greater.

While the present invention has been particularly shown and described with reference to exemplary embodiments thereof, it will be understood by those of ordinary skill in the art that various changes in form and details may be made therein without departing from the spirit and scope of the present invention as defined by the following claims. It is therefore desired that the present embodiments be considered in all respects as illustrative and not restrictive, reference being made to the appended claims rather than the foregoing description to indicate the scope of the invention.

What is claimed is:

1. A display panel comprising:
a first substrate;
a first sensor pad that is formed on the first substrate;
a second sensor pad that is spaced apart from the first sensor pad;
a second substrate that is disposed to face the first substrate;
a common electrode that is formed on the second substrate;
a first sensor spacer that is formed on the second substrate to overlap the first sensor pad and protrudes toward the first substrate;
a second sensor spacer that is formed on the second substrate to overlap the second sensor pad and protrudes toward the first substrate; and
a sensor electrode that is formed on the first sensor spacer and the second sensor spacer to overlap the first sensor pad and the second sensor pad,
wherein the second sensor spacer protrudes toward the first substrate farther than the first sensor spacer, lateral sides of the first sensor spacer and the second sensor spacer are connected to each other by a connection protruding toward the first substrate farther than the common electrode, the sensor electrode is a floating electrode, and the sensor electrode is separated from the common electrode.

2. The display panel of claim 1, wherein the common electrode is transparent.

3. The display panel of claim 1, wherein a distance between the second sensor pad and the second sensor spacer is smaller than a distance between the first sensor pad and the first sensor spacer.

4. The display panel of claim 3, wherein a difference between the distance between the second sensor pad and the second sensor spacer and the distance between the first sensor pad and the first sensor spacer is 0.1 μm or greater.

5. The display panel of claim 3, wherein the second sensor pad and the second sensor spacer contact each other with the sensor electrode disposed therebetween.

6. The display panel of claim 1, further comprising a thin film transistor (TFT) formed on the first substrate.

7. The display panel of claim 1, wherein the sensor electrode formed on the second sensor spacer contacts the second sensor pad in response to a pressure and the sensor electrode formed on the first sensor spacer contacts the first sensor pad in response to the pressure exceeding a force supported by the second sensor spacer and compressing the second sensor pad.

8. The display panel of claim 7, wherein the pressure exceeds the force supported by the second sensor spacer for at least 80 gram-force of pressure.

9. A manufacturing method of a display panel, the method comprising:
forming a first sensor pad and a second sensor pad that are spaced apart from each other on a first substrate;
forming a common electrode on a second substrate;
forming a first sensor spacer and a second sensor spacer on the second substrate to overlap the first sensor pad and the second sensor pad, respectively, and to protrude toward the first substrate, the second sensor spacer protruding toward the first substrate farther than the first sensor spacer, lateral sides of the first sensor spacer and the second sensor spacer connecting to each other by a connection protruding toward the first substrate farther than the common electrode;
forming a sensor electrode on the first sensor spacer and the second sensor spacer to overlap the first sensor pad and the second sensor pad, wherein the sensor electrode is a floating electrode and the sensor electrode is separated from the common electrode; and
disposing the second substrate to face the first substrate.

10. The manufacturing method of claim 9, wherein the common electrode is transparent.

11. The manufacturing method of claim 9, wherein the first sensor spacer and the second sensor spacer are formed using a slit mask or a halftone mask.

12. The manufacturing method of claim 9, wherein a distance between the second sensor pad and the second sensor spacer is smaller than a distance between the first sensor pad and the first sensor spacer.

13. The manufacturing method of claim 12, wherein a difference between the distance between the second sensor pad and the second sensor spacer and the distance between the first sensor pad and the first sensor spacer is 0.1 μm or greater.

14. The manufacturing method of claim 12, wherein the second sensor pad and the second sensor spacer contact each other with the sensor electrode disposed therebetween.

15. The manufacturing method of claim 9, further comprising a TFT formed on the first substrate.

16. The manufacturing method of claim 9, wherein the sensor electrode formed on the second sensor spacer contacts the second sensor pad in response to a pressure and the sensor electrode formed on the first sensor spacer contacts the first sensor pad in response to the pressure exceeding a force supported by the second sensor spacer and compressing the second sensor pad.

17. The manufacturing method of claim 16, wherein the pressure exceeds the force supported by the second sensor spacer for at least 80 gram-force of pressure.

* * * * *